May 14, 1929.  C. F. A. EDDY  1,712,554
SIGNAL SYSTEM AND DIRECTION INDICATOR FOR AUTOMOBILES
Filed July 20, 1923   5 Sheets-Sheet 1

Inventor
Charles F. A. Eddy
By Louis Bagger & Co.
his Attorneys

May 14, 1929.  C. F. A. EDDY  1,712,554
SIGNAL SYSTEM AND DIRECTION INDICATOR FOR AUTOMOBILES
Filed July 20, 1923  5 Sheets-Sheet 2
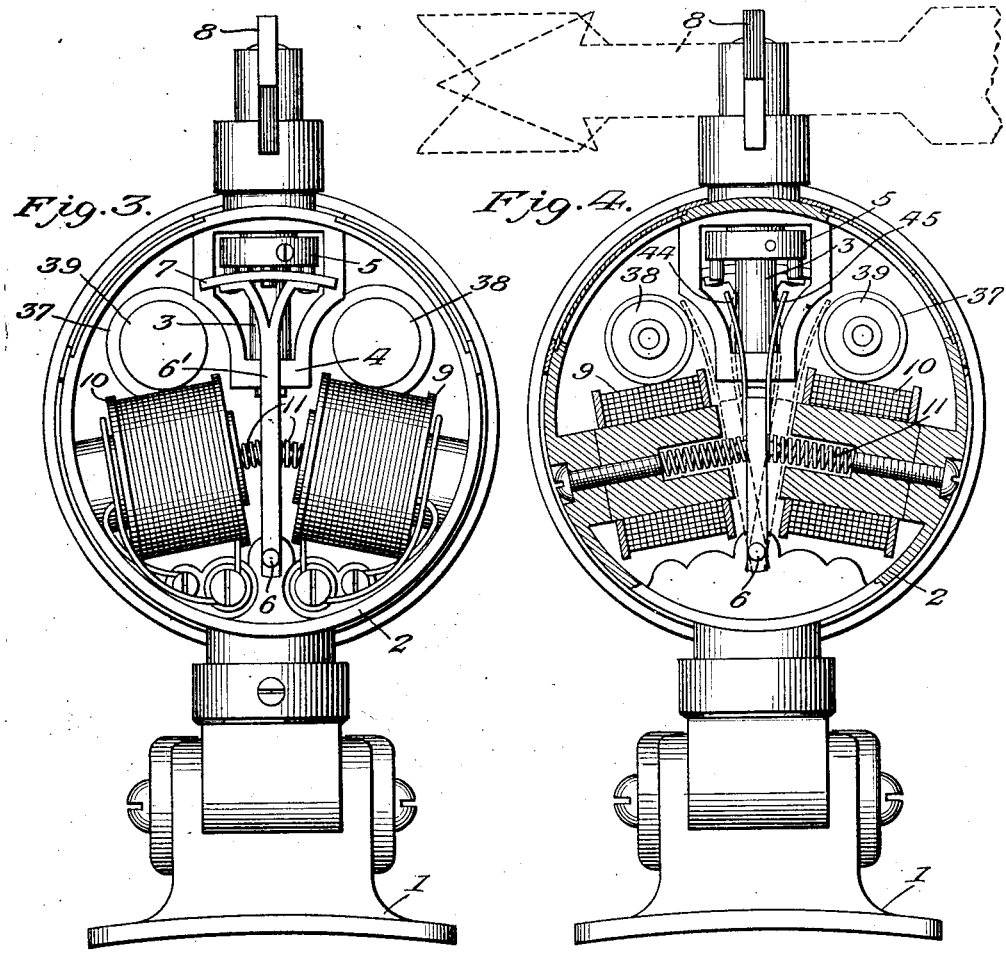
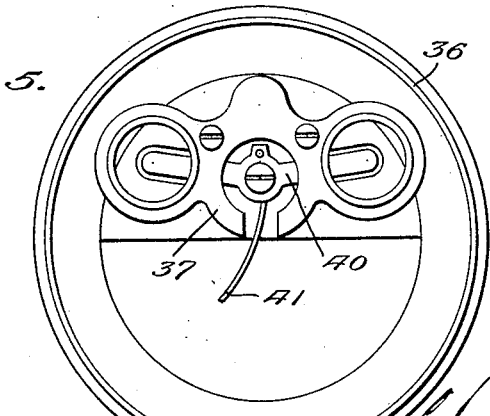
Inventor

May 14, 1929.  C. F. A. EDDY  1,712,554
SIGNAL SYSTEM AND DIRECTION INDICATOR FOR AUTOMOBILES
Filed July 20, 1923  5 Sheets-Sheet 3
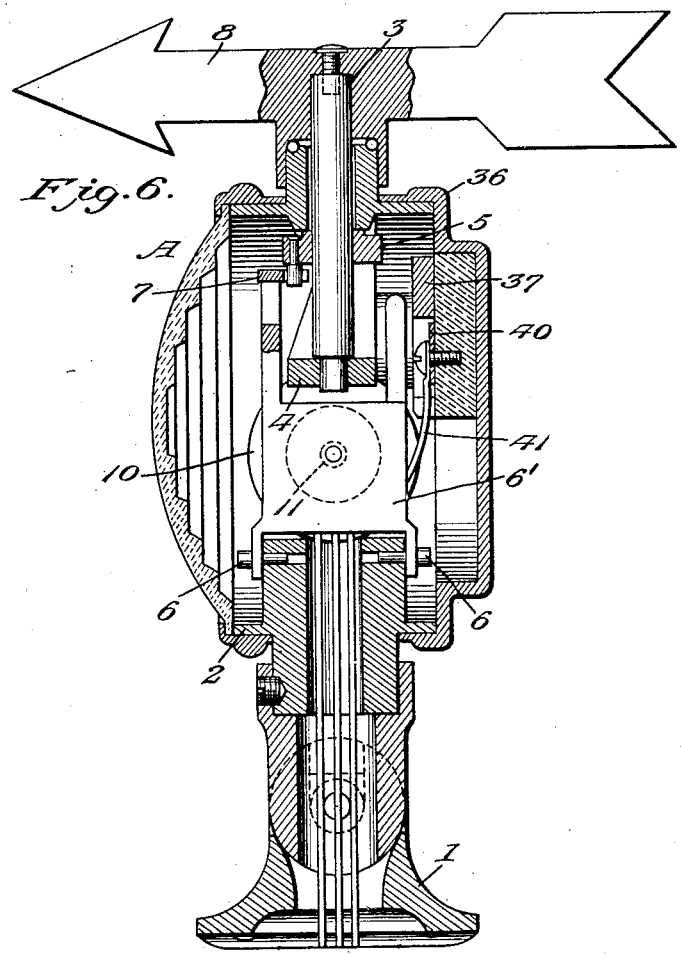
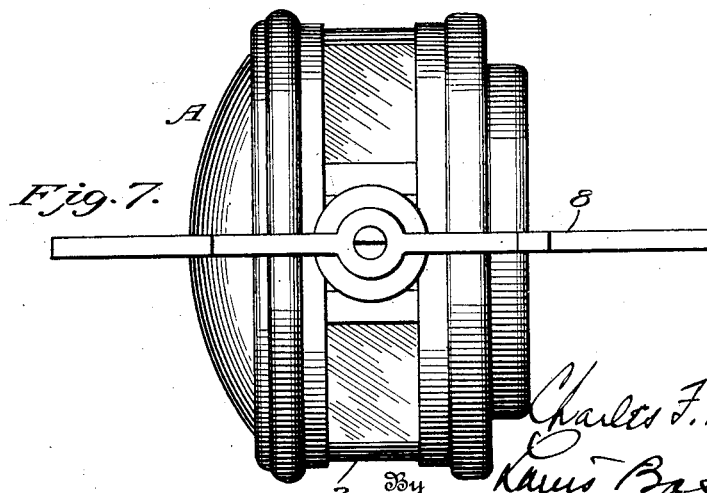
Inventor
Charles F. A. Eddy
By Louis Bagger
Attorney May 14, 1929.  C. F. A. EDDY  1,712,554
SIGNAL SYSTEM AND DIRECTION INDICATOR FOR AUTOMOBILES
Filed July 20, 1923    5 Sheets-Sheet 4
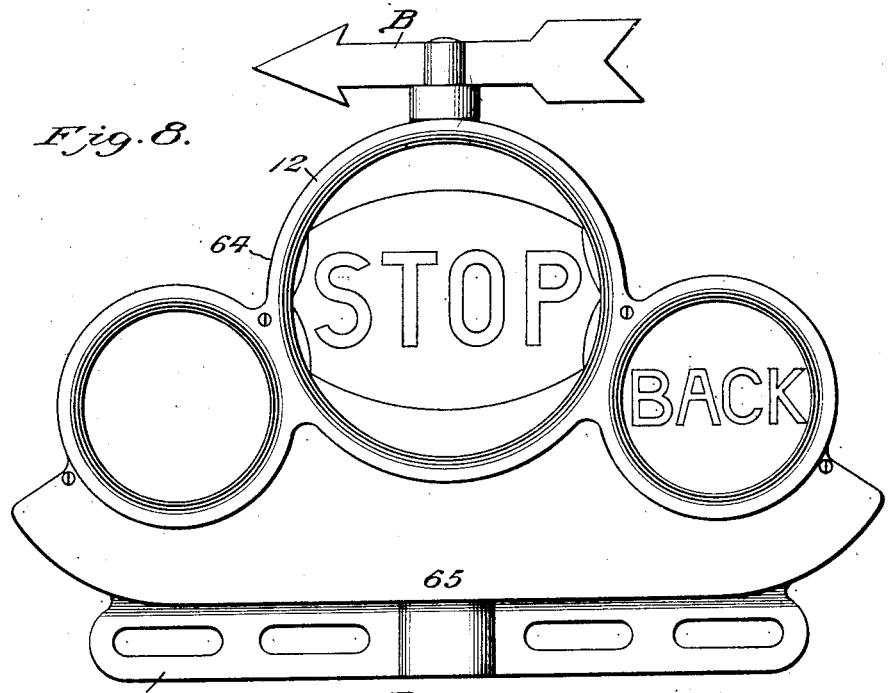
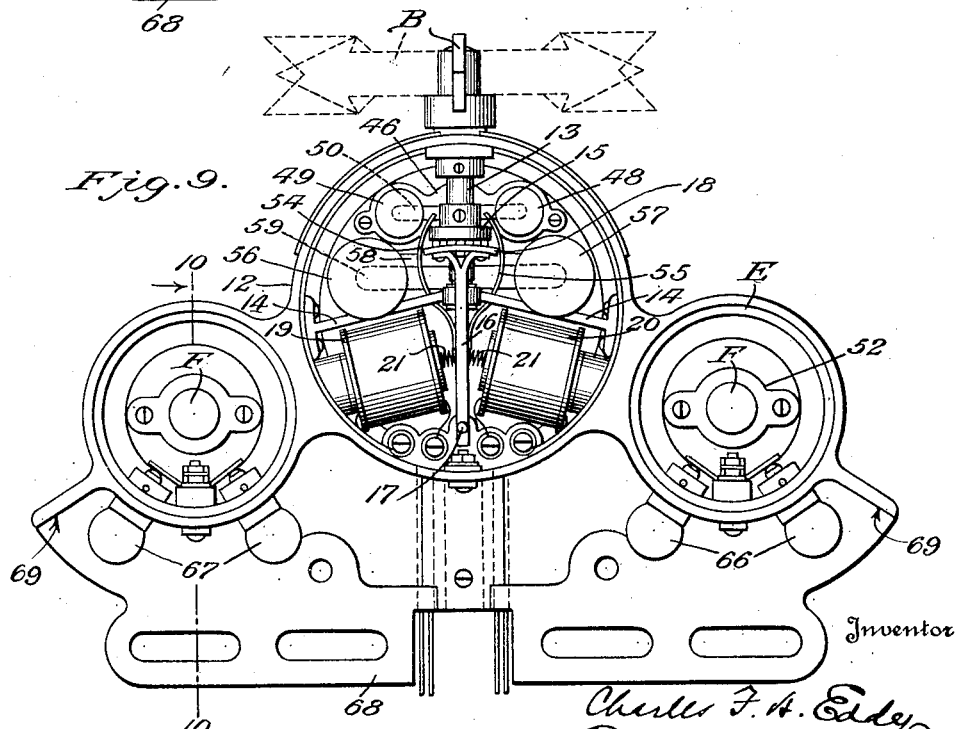
Inventor
Charles F. A. Eddy
By Louis Baggse
Attorneys May 14, 1929. C. F. A. EDDY 1,712,554
SIGNAL SYSTEM AND DIRECTION INDICATOR FOR AUTOMOBILES
Filed July 20, 1923 5 Sheets-Sheet 5
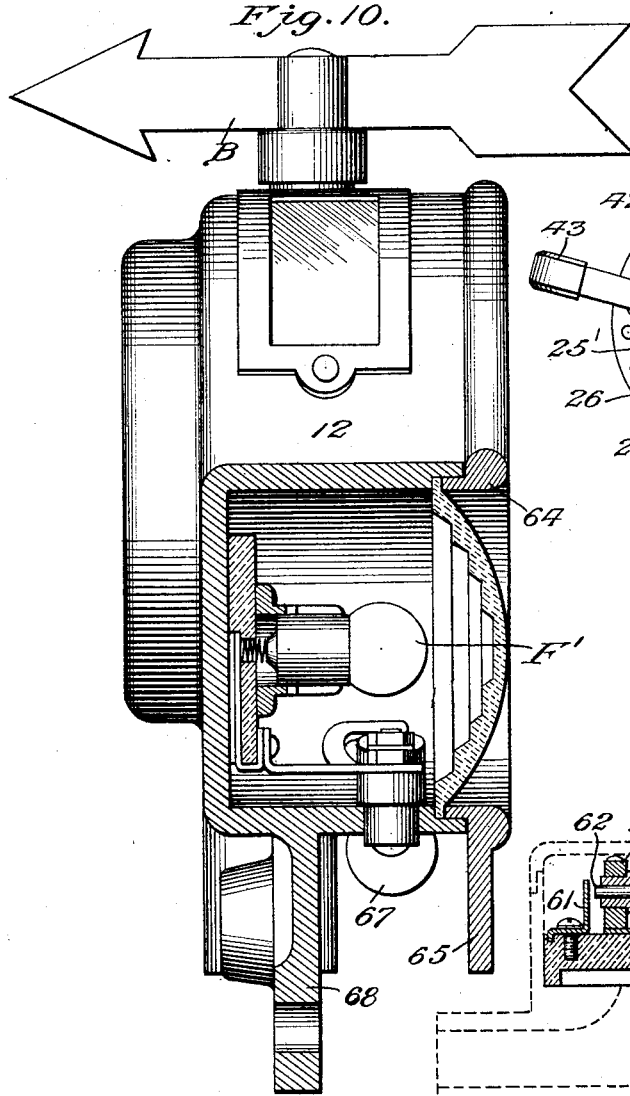
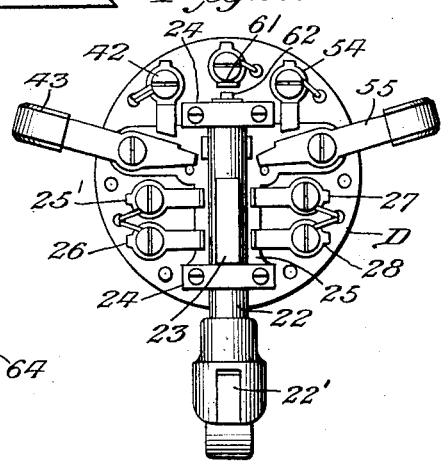
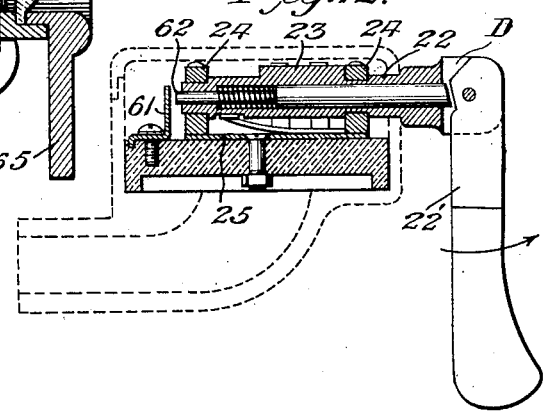
Inventor
Charles F. A. Eddy
By Louis Bagger
Attorneys Patented May 14, 1929.

1,712,554

UNITED STATES PATENT OFFICE.

CHARLES F. A. EDDY, OF NEW LONDON, CONNECTICUT.

SIGNAL SYSTEM AND DIRECTION INDICATOR FOR AUTOMOBILES.

Application filed July 20, 1923. Serial No. 652,809.

This invention relates to a signal system and direction indicator for automobiles.

The object of the invention contemplates the provision or means in the form of arrows indicating at the front and rear of the machine, the direction in which it is about to turn, said means including illuminating arrows when in use.

Another object of the invention is to provide means for indicating when the machine is about to stop together with means for indicating when the machine is to back. The illuminating system further includes means for illuminating the license tag in such a manner that the rays of light are projected laterally at the rear of the machine beyond each end thereof.

In the accompanying drawings:

Fig. 3 is a front view of the front indicating device with the lens removed;

Fig. 4 is a rear view partly in vertical section of the front indicating device;

Fig. 5 is a front elevation of the removable back showing the position of the lamp sockets thereon;

Fig. 6 is a transverse vertical sectional view through the front indicating device;

Fig. 7 is a plan view of the same;

Fig. 8 is a front elevation of the rear signal device;

Fig. 9 is a similar view with the cover plate and lenses removed;

Fig. 10 is a transverse sectional view on the line 10—10 of Fig. 9;

Fig. 11 is a plan view of the controlling switch; and

Fig. 12 is a vertical sectional view through the same.

Figure 1:
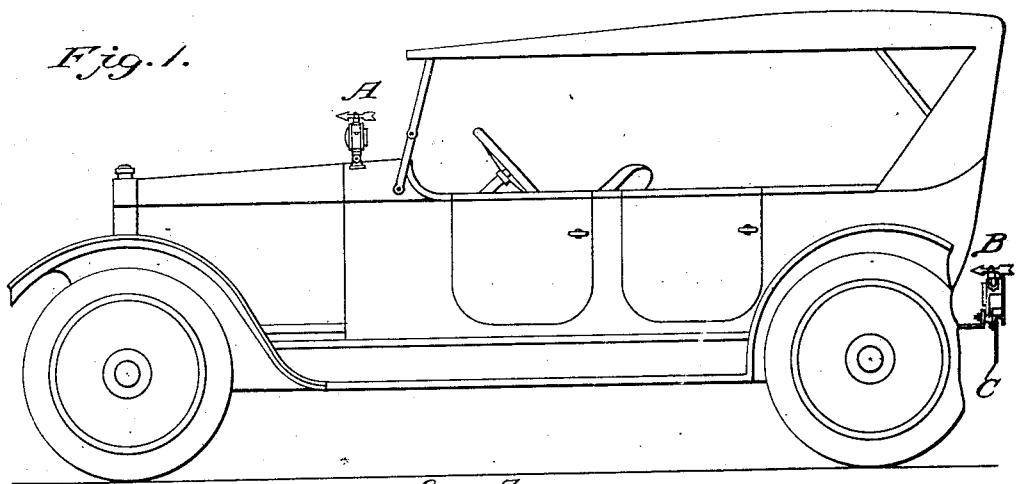
Figure 1 is a side elevation of a machine showing the position of the signalling devices thereon.

As indicated in Fig. 1 there is arranged, preferably on the cowl of the automobile a direction indicating device A which is adapted to cooperate with a similar direction indicating device in the form of an arrow B arranged at the rear of the machine, a license tag C, being suitably supported upon the indicating device at the rear of the machine.

Arranged at some convenient place within reach of the operator, as, for instance, upon the steering post, is a controlling device D.

The indicating device arranged on the front of the machine preferably consists of a base 1 to which is pivotally attached the casing 2. Vertically mounted in this casing is a rotatable shaft 3, the lower end of which is suitably supported in a step bearing 4. Secured to the shaft 3 is a pin gear 5. Pivoted as at 6 to the bottom of the casing is an oscillating arm or armature 6', being provided at its upper end with a segmental ear 7 which is adapted to mesh with the pin gear 5. At the outer end of the shaft 3 and exteriorly of the casing is an indicating arrow 8, which, when armature 6' is oscillated, is adapted to turn at right angles to its normal position indicating in which direction the machine is about to turn. Arranged on each side of the armature 6' is a set of magnets 9 and 10 the armature being held at a normal vertical position between the magnets 9 and 10 by means of springs 11 extending outwardly from the center of the magnets 9 and 10.

At the rear of the machine, the indicating device preferably consists of the following construction. Mounted in the casing 12 is a vertical shaft 13 on the upper end of which is mounted the indicating arrow B external of the casing. The lower end of the shaft 13 is supported by a suitable truss 14 extending inward from the inner periphery of the casing 12. Keyed to the shaft 13 is a pin gear 15. The numeral 16 indicates an armature pivoted as at 17 to the bottom of the casing 12, the upper end of which is provided with a segmental ratchet gear 18 which is adapted to engage the pin gear 15. Arranged on either side of the armature 16 are magnets 19 and 20. Extending centrally from the magnets 19 and 20 are the springs 21 adapted to bear on either side of the armature 16 and hold it in its normal position.

Figure 2:
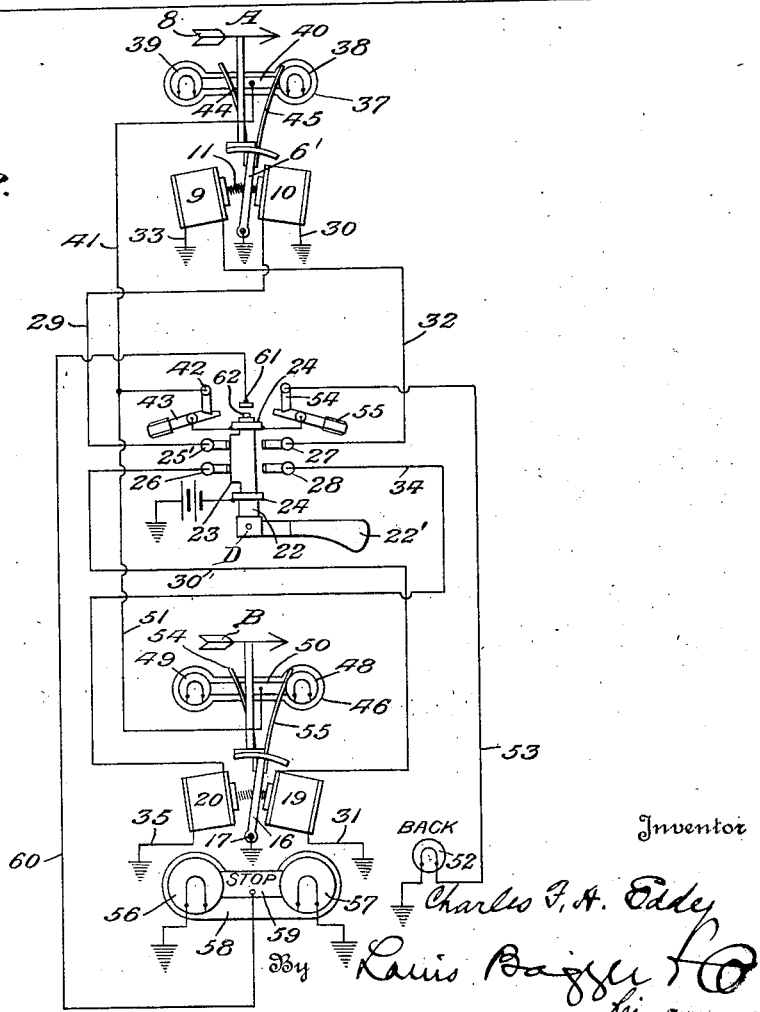
Fig. 2 is a diagrammatic view showing the wiring of the front and rear signalling devices and the controlling mechanism.

Located within convenient reach of the operator is an actuating switch preferably consisting of a rotatable shaft 22 carrying a contact segment 23 said shaft being mounted in suitable bearings 24—24 extending outwardly from the metallic base 25, the latter being grounded. Arranged on either side of the shaft 22 are two sets of contact points 25', 26, 27 and 28. As shown in Fig. 2, the point 25' is connected by means of a wire 29 to the magnet 10 of the front direction indicator, said magnet being grounded to the frame by means of a wire 30. The contact joint 26 is connected by means of a wire 30' to the magnet 19, the latter being grounded to the frame by means of a wire 31. The contact point 27 is connected by a wire 32 to the magnet 9, the latter being grounded by a wire 33. The contact point 28 is connected by a wire 34 to the magnet 20, the latter being grounded by means of a wire 35. Thus it will be seen that as the handle 22 is turned to bring the segment 23 into contact with the contact members 25′ and 26 the magnet 10 of the front signal will be energized pulling the armature 6′ to the right in turn turning the arrow 8 to the right while contact member 26 when coming in contact with segment 23 energizes the magnet 19 of the rear signal drawing the armature 16 to the right causing the arrow B to be turned to the right and noting the direction in which the machine is to turn, namely, to the right.

It is desirable to illuminate the arrow when in either its right or left position. This is preferably accomplished by the following construction.

Referring to the front signal, arranged at the rear of the casing 2 is a removable back 36 and in the back 36 upon a suitable insulation is a lamp receptacle 37 adapted to support the lights 38 and 39. Arranged beneath and insulated from the receptacle 37 is a metallic strip 40 which is adapted to contact with the central portion of the lights 38 and 39. This member 40 is in turn connected by a wire 41 to a terminal 42. Pivotally mounted upon the base 25 is a switch lever 43 which when actuated to contact with the member 42 supplies current to the member 40.

Carried by the armature 6′ are two contact members 44 and 45 one of which when the armature is turned in either direction is adapted to contact with the receptacle 37 supporting the lights 38 and 39 thereby completing the circuit in that the armature is grounded to the casing causing the lights 38 and 39 to illuminate the arrow through the glass plates in the top of the casing in whichever way it is turned.

A similar arrangement for illuminating the rear signal is provided, which preferably consists of a base 46 which is insulated from the casing 12, said base serving as a receptacle for the arrow illuminating lights 48 and 49. Arranged beneath and insulated from the base 46 is a metallic member 50 which is adapted to form a contact between one side of the lamps 48 and 49, said member 50 being in turn actuated by a wire 51 to the contact 42 controlled by the lever 43.

Carried by armature 16 of the rear light are contact members 54 and 55 which when the armature is oscillated in either direction form a contact between the base carrying the lights 48 and 49 completing a circuit for illuminating the members 48 and 49 when the arrow is turned in either direction. Said members are provided with a switch 43 in the circuit of the front and rear arrow illuminating lights to enable the operator to cut out this circuit when it is desirable to utilize the arrows as an indicating medium in the day.

Arranged in the casing 12 at the rear of the machine is a casing E in which is suitably mounted a light F preferably covered by a lens which will be designated as the "back light". This light is mounted upon a suitable base 52 one side of which is preferably grounded to the casing E. Leading from the receptacle is a wire 53 connected to a contact point 54 which is adapted to be engaged by a switch 55 mounted upon the switch base 25, the switch serving to control the rear back light independently of the other circuits.

The lens of the casing 12 enclosing the arrow controlling mechanism has a colored lens having inscribed thereon the word "Stop." Arranged in the casing are the lights 56 and 57 mounted upon a suitable base 58 one side of which is grounded to the casing 12. Arranged beneath the base is a member 59 which contacts with the other side of the lights 56 and 57, said member 59 in turn being connected by a wire 60 to a contact member 61 mounted adjacent the outer end of the rotary shaft 22 of the switch. Arranged within the rotary shaft 22 is a longitudinal movable contact member 62 adapted to be moved longitudinally in the shaft 22 by means of the switch lever 22′ the construction being such that when the lever 22′ is moved toward the operator said plunger 62 contacts with the member 61 causing the lights 56 and 57 to be illuminated to display the word "Stop" described upon the lens covering this casing.

Arranged at the opposite side of the indicating signal B at the rear is the usual tail light F′, the circuit controlling the latter being arranged in the usual lighting system of the car.

As indicated in Figs. 8 and 10 the lens plate 64 is of such construction as to inclose the lens for the indicating casing, the tail light and back light, said plate having a projecting member 65 extending below a sufficient distance to form an inclosure beneath these casings providing a compartment for the lights 66 which project radially from the back light casing E and the lights 67 which project radially from the tail light casing F′ forming a means for illuminating the license tag C which is secured to the projecting flange 68 of the casing 12. It will be observed that the outer walls 69 of the casing 12 are arranged at such an angle that the rays from the license tag illuminating lights will extend approximately horizontally thereby lighting a considerable area of ground on either side of the car.

It will thus be seen that I have arranged a combination direction indicating device and a signal device for an automobile which is complete and compact in every respect and one which will meet with every requirement necessary and properly warn approaching cars and others as to the direction the automobile is about to take, at the same time, warning those in the rear the intention of the operator as to what movements are to be made.

I claim:

1. A direction indicator including a casing, lamp sockets mounted therein, illuminating means mounted in said sockets, an oscillatory shaft carried by the casing, a signal indicator fixed on said shaft, means for oscillating the shaft, and spring contact fingers carried by said oscillating means and extending laterally in opposite directions therefrom into position to engage a lamp socket for closing a circuit through said illuminating means upon the movement of said oscillatory shaft to a signalling position.

2. A direction indicator including a casing, lamp sockets mounted therein, electric illuminating means mounted in said sockets, an oscillatory shaft carried by the casing, a signal indicator fixed on said shaft, an armature for oscillating the shaft, electro-magnets for moving said armature, and spring contact fingers carried by and extending outwardly in opposite directions from said armature in position to engage a lamp socket for closing an electric circuit through the illuminating means upon the movement of the oscillating shaft to a signalling position, to illuminate the signal indicator.

3. A signal indicator including a compartment having openings in the top thereof, a lens closing the outer end of said compartment, a movable signal mounted above the openings in said compartment, illuminating means within said compartment for illuminating the lens, and secondary illuminating means independent of said first-mentioned illuminating means arranged in position in said compartment to shine through the top openings to illuminate the signal.

4. A direction indicator including a casing having an upwardly extending projection in the bottom thereof, a step-bearing mounted in said casing, a shaft having the lower end thereof received in said step-bearing, a gear mounted on said shaft, an armature pivotally mounted on said upwardly extending projection and extending upwardly therefrom, arms extending upwardly from the opposite sides of said armature and on the opposite sides of said step-bearing, a rack formed on one of said arms for engagement with the gear, and electro-magnets for actuating said armature.

5. A direction indicator including a casing having an upwardly extending projection in the bottom thereof, a step-bearing mounted in said casing adjacent the center thereof, arms connected with and extending from said step-bearing to the walls of the casing, a shaft having the lower end thereof received in said step-bearing, a signal indicator mounted on said shaft, a gear mounted on said shaft above the step-bearing, an armature pivotally mounted on said upwardly extending projection and extending upwardly therefrom, an arm extending upwardly from said armature on one side of said step-bearing and shaft, a rack formed on said arm for engagement with the gear, lamp sockets mounted in said casing, illuminating means mounted in said sockets, electro-magnets mounted on opposite sides of and for actuating said armature, and spring contact fingers extending upwardly from said armature on the opposite side of said step-bearing from the arm for engaging a lamp socket to close a circuit through the illuminating means upon the movement of the indicator to a signalling position.

6. A direction indicator including a compartment having openings therein, a movable signal mounted adjacent said openings, a lens for closing the outer end of said compartment, illuminating means within the compartment for illuminating the lens, and secondary illuminating means independent of the first-mentioned illuminating means arranged in position in said compartment to illuminate the signal through the openings.

7. A direction indicator including a casing, a movable signal carried thereby, an armature for actuating said signal, operating means associated with the armature lamp sockets mounted in the casing for supporting illuminating means for the signal, and spring contact fingers extending laterally in opposite directions from the armature in position to engage the lamp sockets on substantial movement of the signal to close an electrical circuit through the illuminating means for said signal.

8. A direction indicator including a casing, a step-bearing depending from the upper wall of said casing, a substantially vertically disposed shaft having the lower end thereof received in and supported by said step-bearing, the upper end of said shaft extending through the top of the casing, a signal mounted on said shaft exteriorly of the casing, a gear mounted on the shaft above the step-bearing, an armature pivotally mounted in the lower end of the casing and extending to a point immediately beneath and in close proximity to the step-bearing, an arm extending upwardly from one side of said armature on one side of the step-bearing and carrying a rack in position to mesh with the gear, lamp sockets mounted in the casing for supporting illuminating means for the signal, and spring contact fingers carried by the opposite side of the armature from the arm and extending upwardly on the opposite side of the step-bearing for engaging the lamp sockets to close an electrical circuit through the illuminating means for the signal.

9. A signal indicator including a casing, a step-bearing depending from the upper wall of said casing, a substantially vertically disposed shaft having the lower end thereof received in and supported by the step-bearing, the upper end of said shaft extending through the top of said casing, a sleeve carried by the casing and extending upwardly therefrom about the shaft to form a bearing therefor, and a movable signal mounted upon the upper end of the shaft and seated upon said shaft and the end of the sleeve, said signal having a depending sleeved flange fitted about the sleeve on the casing.

10. A direction indicator including a compartment having openings in the top thereof, a movable signal mounted on the compartment above the top thereof and adjacent the openings, and illuminating means mounted within the compartment in position to illuminate the signal through the openings, said compartment having a side window therein, and independent illuminating means within the compartment for illuminating the side window.

In testimony whereof I hereunto affix my signature.

CHARLES F. A. EDDY.